United States Patent [19]

Henton et al.

[11] Patent Number: 4,972,032

[45] Date of Patent: Nov. 20, 1990

[54] PROCESS FOR PREPARING COPOLYMERS OF ALPHA-METHYLSTYRENE AND ACRYLONITRILE

[75] Inventors: David E. Henton; Robert P. Dion, both of Midland; Norman A. Lefevre, Bay City, all of Mich.

[73] Assignee: The Dow Chemical Company, Midland, Mich.

[21] Appl. No.: 383,268

[22] Filed: Jul. 19, 1989

Related U.S. Application Data

[63] Continuation of Ser. No. 134,415, Dec. 17, 1987, abandoned.

[51] Int. Cl.$^5$ .......................... C08F 2/22; C08F 212/12
[52] U.S. Cl. .......................................... 526/80; 526/87; 526/201; 526/342; 525/86; 525/242; 525/243
[58] Field of Search ................. 525/243, 316, 242, 86; 526/80, 87, 342

[56] References Cited

U.S. PATENT DOCUMENTS

| | | |
|---|---|---|
| 3,732,336 | 5/1973 | Duke et al. . |
| 4,273,895 | 6/1981 | Minematsu et al. . |
| 4,294,946 | 10/1981 | Minematsu et al. ............ 526/342 X |
| 4,296,946 | 10/1981 | Minematsu et al. . |
| 4,306,043 | 12/1981 | Abe et al. . |
| 4,361,684 | 11/1982 | Minematsu et al. . |
| 4,427,832 | 1/1984 | Yagi et al. . |
| 4,448,580 | 5/1984 | Abe et al. . |
| 4,450,256 | 5/1984 | Matsumoto et al. . |
| 4,525,530 | 6/1985 | Mathumoto et al. . |
| 4,526,928 | 7/1985 | Mathumoto et al. . |

*Primary Examiner*—Joseph L. Schofer
*Assistant Examiner*—F. M. Teskin

[57] ABSTRACT

Copolymers of α-methylstyrene and acrylonitrile having improved composition of uniformity are prepared by emulsion polymerizing a first monomer stream having a weight ratio of α-methylstyrene/acrylonitrile from about 75/25 to about 85/15 and thereafter polymerizing a second monomer feed stream comprising acrylonitrile.

6 Claims, No Drawings

PROCESS FOR PREPARING COPOLYMERS OF ALPHA-METHYLSTYRENE AND ACRYLONITRILE

This is a continuation, of application Ser. No. 134,415 filed Dec. 17, 1987, now abandoned.

BACKGROUND OF THE INVENTION

The present invention relates to a process for preparing copolymers of α-methylstyrene and acrylonitrile. More particularly the present invention relates to a process for preparing such copolymers having improved uniformity of monomer content thereby achieving improved physical properties.

It is previously known in the art to prepare copolymers of α-methylstyrene and acrylonitrile. Such copolymers have desirable properties in that they exhibit improved heat resistance. Consequently, molded parts produced from such copolymers find commercial use in such applications where resistance to deformation due to the effects of elevated temperatures is particularly desired.

It is previously known in the art that copolymers of α-methylstyrene and acrylonitrile generally possess improved resistance to the effects of high heat as evidenced by a high glass transistion temperature ($T_g$) when compared to copolymers of styrene and acrylonitrile. Processes directed to the preparation of such copolymers have been previously disclosed in U.S. Pat. Nos. 4,294,946; 4,526,928; 4,361,684; and 4,450,256; the teachings of which are herein incorporated in their entirety by reference thereto.

Despite the availability of such processes as are described in the previously disclosed United States Patents, copolymers prepared by the above identified processes have been found to be deficient in one or more physical properties. More particularly, it has been found that batch processes wherein all monomers to be polymerized in an emulsion polymerization are added initially or by means of one or two additions during the course of the polymerization result in compositions having monomer contents that vary due to the variation in monomer content experienced during the polymerization. Such variation or compositional drift is the result of a disparity in the reactivity of the two monomers, α-methylstyrene and acrylonitrile. In particular, it has been found that acrylonitrile is more reactive under standard polymerization conditions and is consumed faster than is alpha-methylstyrene monomer. Consequently, copolymers prepared from an initial charge of monomers or otherwise utilizing reaction conditions that are not designed to account for the differing reactivities of the two monomers comprise a mixture of polymers having differing monomer content.

Optimal polymer properties are believed to result from copolymers comprising α-methylstyrene and acylonitrile having a weight ratio of polymerized monomers from about 70/30 to about 85/15. Copolymeric products comprising even small amounts of polymer product of a composition outside of the above stated range tend to be deficient in desirable physical properties such as toughness or impact strength.

In the previously identified U.S. Pat. No. 4,526,928 there is disclosed a process for the preparation of copolymers of α-methylstyrene and acrylonitrile wherein the ratio of α-methylstyrene to acrylonitrile is maintained at greater than 90/10 at all times during the polymerization. While such process results in the preparation of a copolymer having a high glass transition temperature, it has now been discovered that processes involving the polymerization of monomers maintaining such a high ratio of α-methylstyrene to acrylonitrile disadvantageously are characterized by lengthy reaction times due to the excessive amount of α-methylstyrene which has a reduced reaction rate compared to acrylonitrile. Consequently, in order to provide a commerically acceptable polymerization process it would be desirable to achieve a reduction of reaction time. Moreover, it has now been discovered that glass transition temperatures of polymers prepared in the aforementioned manner are not necessarily better than those prepared utilizing reduced ratios and that the toughness of the resulting polymer (as measured by notched Izod impact values) is often inferior. This undesired result is believed to be due to compositional drift, i.e. the preparation of small amounts of polymer having inferior properties due to a gross varience in monomer ratio during the polymerization.

In U.S. Pat. No. 4,294,946 there is also disclosed a process for the preparation of copolymers of α-methylstyrene and acrylonitrile. In the disclosed process the reaction is not terminated until conversion of monomer exceeds 99%. In the process, α-methylstyrene is batched loaded and acrylonitrile is added to the reactor by a secondary addition step. Although the reference suggests that the process may be operated in a continuous manner, no teachings as to the relative rates of addition of the various monomers for such a continuous process is suggested therein. Furthermore, the reference provides no teaching as to the existence and effect of compositional drift in the copolymers or for a method for alleviating the same.

It would be desirable if there were provided an improved process for the preparing of copolymers of α-methylstyrene and acrylonitrile resulting in an improved uniformity and consequently improved physical properties thereof.

SUMMARY OF THE INVENTION

According to the present invention there is now provided a process for preparing copolymers of α-methylstyrene and acrylonitrile having improved uniformity and an overall monomer weight ratio (α-methylstyrene/acrylonitrile) from about 70/30 to about 85/15 comprising the steps of:

(1) charging a first monomer feed stream comprising α-methylstyrene and acrylonitrile in a weight ratio of from about 75/25 to about 85/15 in a continuous or semicontinuous manner to a well mixed reactor operating under emulsion polymerization conditions and initially comprising from about 0.05 to about 5.0% by weight based on final copolymer weight of a polymeric seed latex, until the percent of unreacted α-methylstyrene plus acrylonitrile based on total monomer and polymer weight is about 20 to 45;

(2) continuously or semicontinuously charging to the reactor with mixing under emulsion polymerization conditions a second monomer feed stream comprising acrylonitrile in the substantial absence of α-methylstyrene until the percent of unreacted α-methylstyrene plus acrylonitrile remaining in the reactor is about 5 to 15 based on total monomer and polymer weight;

(3) continuing the emulsion polymerization until total monomer conversion reaches at least about 90%;

(4) recovering the copolymer of α-methylstyrene and acrylonitrile.

Copolymers prepared according to the above described process possess an improved uniformity of composition and a concomitant improvement in physical properties, particularly improved toughness as measured by Izod impact. As a consequence of the above improvement, copolymers according to the present invention that are further blended with toughening agents, particularly rubbers such as butadiene rubbers are capable of achieving higher levels of toughness through the use of reduced levels of additives. Consequently, formulated copolymer products prepared utilizing the present invented compositions are able to achieve improved levels of performance without concomitant sacrifice of alternative physical properties. More particularly, melt flow rate that normally is adversely affected by increasing levels of rubbery additives, may be maintained at elevated levels utilizing reduced amounts of impact modifying additives due to the inherent improved toughness of compositions prepared according to the present invented process.

DETAILED DESCRIPTION OF THE INVENTION

The process of the present invention utilizes known emulsion technology including the use of emulsifiers such as sodium lauryl sulfate, potassium oleate, sodium oleate, potassium or sodium salts of fatty acids, potassium or sodium salts of rosin acids and sodium alkylbenzene sulfonates. A particularly desired emulsifier is sodium n-dodecylbenzene sulfonate. All ingredients employed in the polymerization are purified prior to use. Moreover, the reaction is conducted under an inert atmosphere such as nitrogen, preferably at a slightly elevated pressure from about 5 to about 20 lbs. per square inch. The reaction is conducted at elevated temperatures on the order of about 35° to about 95° C. preferably from about 50° to about 90° C. Agitation is employed in order to maintain a homogeneous reaction mixture. A free radical initiator such as the well known sodium per oxydisulfate or potassium peroxydisulfate initiators may be employed. A molecular weight regulator such as a mercaptan or other suitable chain transfer agent may also be employed.

In a preferred embodiment of the present invention, α-methylstyrene and acrylonitrile are initially added in a monomer weight ratio of α-methylstyrene to acrylonitrile from about 80/20 to about 85/15. While the reaction is preferably conducted in a continuous manner, a semicontinuous addition of monomers may also be employed. By semicontinuous addition is meant addition of the monomer charge in aliquots followed by reaction periods on the order of about one tenth of the total reaction time or less.

Typically, α-methylstyrene and acrylonitrile are continuously added over a period of from 1 to 6 hours under polymerization conditions. As a general rule, the initial charging of a first monomer feed stream attains an excess of unreacted α-methylstyrene monomer of from about 600 weight percent to about 5000 weight percent based on unreacted acrylonitrile. Addition of the second monomer feed stream comprising acrylonitrile monomer follows immediately or relatively soon after cessation of comonomer addition and is continued under polymerization conditions for about 1 to about 4 hours. Addition of the second monomer feed stream usually results in the lowering of total quantity of unconverted monomers although there generally remains an excess of unreacted α-methylstyrene of from 600 to 5000 weight percent based on the weight of unreacted acrylonitrile. After complete addition of monomers the polymerization is generally allowed to continue for from about one quarter hour to about one hour.

In a preferred embodiment, the initial monomer concentrations and the rate of addition of acrylonitrile monomer are adjusted so as to yield a polymer product having a monomer weight ratio (α-methylstyrene/acrylonitrile) from about 75/25 to about 78/22. In order to achieve commercially practical reaction times, conversions on the order of about 90% to about 96% based on total monomer weight are generally employed. The resulting product is recovered by normal recovery techniques including steam stripping of the resulting mixture to remove volatile components, coagulation, and pelletizing of the resulting product.

In applications wherein additional modification of impact properties is desired, a rubber such as a styrene or styrene/acrylonitrile grafted polybutadiene rubber or styrene/butadiene copolymer rubber may be employed. In a preferred embodiment such a grafted rubber latex may be added to the resulting α-methylstyrene/acrylonitrile copolymer latex prior to coagulation and pelletizing thereof. The resulting rubber modified polymer product may be dried and employed as an injection molding resin.

As previously noted, the addition of acrylonitrile monomer in a continuous or semicontinuous manner after an initial period of copolymer formation is conducted so as to result in retaining the monomer concentration in the reaction mixture between the aforementioned limits. Addition of acrylonitrile in a too rapid manner results in compositional drift due to the momentary preparation of high acrylonitrile containing copolymers having inferior impact properties which adversely affects the physical properties of the resulting composition.

The seed latex employed in the initial polymerization may suitably comprise any compatible polymeric latex having a particle size preferably from about 100 Angstroms to about 1,000 Angstroms. Preferred is a polymeric seed latex comprising polystyrene, polybutadiene, a copolymer of styrene and butadiene, or a copolymer or inter-polymer of α-methylstyrene and acrylonitrile which could be preformed or prepared in situ before the polymerization.

Having described the new invention the following examples are provides as further illustrative and are not to be construed as limiting.

EXAMPLE 1

A one-gallon, glass-lined latex reactor was charged with 1691 g of deionized water, 107 g of polystyrene seed latex (400 Angstrom number average particle size) (30% active), 0.2 g of disodium ethylene diaminetetraacetic acid, 1.0 g of sodium bicarbonate, and 20 g of 43% aqueous sodium n-dodecylbenzene sulfonate. The mixture was purged with nitrogen, and the reactor was then evacuated with a water aspirator three times at room temperature. After the final evacuation, the reactor was pressurized with 10 psi (69 KPa) of nitrogen. The reactor was heated to 85° C. and stirred at 150 rpm. An aqueous feed consisting of 154 g of water, 27.7 g of 43% aqueous sodium n-dodecylbenzene sulfonate, and 2.7 g of sodium persulfate and a monomer feed consisting of 750 g of α-methylstyrene, 187.5 g of acrylonitrile, (providing a ratio α-methylstyrene/acrylonitrile of 80/20) and 0.68 g of n-octyl mercaptan (first monomer feed stream) were started simultaneously and added at rates of 37.4 and 234.6 g per hour to the reaction, respectively. After four hours, addition of first monomer feed stream was halted and the second monomer feed stream consisting of 41.4 g of acrylonitrile and 0.53 g of n-octyl mercaptan was started at a rate of 20.7 g per hour. The aqueous feed rate was changed to 15.5 g per hour. The additions of aqueous feed and second monomer stream were continued for three additional hours. Total monomer feed resulted in a ratio, α-methylstyrene/acrylonitrile, of 77/23. The second monomer feed was then halted, the aqueous feed continued for an additional 15 minutes, and the mixture was retained at 85° C. for 15 minutes. An antifoaming agent (antifoam H-10, 15% active, available from Dow Corning Corporation) was added and volatile components were steam distilled from the mixture. The reaction went to 92% conversion.

The ratio of polymerized α-methylstyrene/acrylonitrile in the finished latex was 76/24.

EXAMPLES 2–4 AND COMPARATIVE

Additional latex samples were prepared substantially according to the techniques of Example 1 utilizing various ratios of monomers in the first monomer feed stream. The latexes were blended with a bimodal styrene/acrylonitrile grafted butadiene rubber prepared according to the following rubber preparation.

Rubber Preparation

A twenty-gallon, glass-lined latex reactor was charged with 61,979 g of bimodal butadiene rubber latex (75% 1400 Angstroms, 25%-8000 Angstroms, 33% active). The mixture was purged with nitrogen, then evacuated with a water aspirator three times at room temperature. The reactor was heated to 80° C. and stirred at 150 rpm. An aqueous feed, consisting of 6618 g of deionized water, 22.1 g of sodium persulfate, and 529.4 g of aqueous 43% sodium n-dodecylbenzene sulfonate, and a monomer feed, consisting of 8603 g of styrene and 2427 g of acrylonitrile, were started simultaneously and added to the reactor at 1792 and 2757 g per hour, respectively. The additions were completed in four hours and the reaction product was retained at 80° C. for an additional 30 minutes. An anti-foaming agent (Antifoam H-10, 15% active) was added and 650 ml of volatile reaction by products were steam stripped from the mixture. The reaction ran to 92% conversion.

The blends comprising 15% by weight rubber are prepared by latex blending, coagulating, dewatering, and pelletizing the resin. Test specimens are prepared by injection molding the resulting products. Tests on such specimens are conducted according to ASTM standards. Resulting are contained in Table I.

TABLE I

| Example | Weight ratio AMS/AN[a] first monomer stream | Total Monomer AMS/AN[a] weight ratio | Mn × 10³[b] | Mw × 10³[c] | MFR[d] | DTUL[e] °C. | Izod Impact Strength[f] |
|---|---|---|---|---|---|---|---|
| Comparative | 90/10 | 77/23 | 37 | 100.5 | 1.0 | 97 | 1.9 |
| 2 | 85/15 | 77/23 | 38.7 | 107.5 | 1.0 | 99 | 3.0 |
| 3 | 85/15 | 79/21 | 37 | 94.7 | 1.3 | 96 | 3.3 |
| 4 | 80/20 | 78/22 | 31.4 | 100.6 | 1.2 | — | 2.6 |

[a] α-methylstyrene/acrylonitrile weight ratio.
[b] number average molecular weight, determined by size exclusion chromatography, tetrahydrofuran eluent, broad molecular weight polystyrene standard.
[c] weight average molecular weight, determined by size exclusion chromatography, tetrahydrofuran eluent, broad molecular weight polystyrene standard.
[d] melt flow rate, g/10 min at 230° C., 5000 g ASTM D-569
[e] Heat deflection temperature underload on unannealed ½" × ⅛" injection molded specimens, at 264 psi measured. ASTM-D-648.
[f] ASTM D-256. Ft lbs/inch of notch on 0.125 inch injection molded specimens.

By examining Table I it may be seen that compositions having both improved toughness and equivalent or improved melt flow rates are obtained according to the present invention utilizing copolymers prepared by observing the processing conditions specified for the present invention.

What is claimed:

1. A process for preparing copolymers of α-methyl styrene and acrylonitrile having improved uniformity and an overall monomer weight ratio (α-methyl styrene/acrylonitrile) from about 70/30 to about 85/15 comprising the steps of:

(1) charging a first monomer feed stream comprising α-methyl styrene and acrylonitrile in a weight ratio of from about 75/25 to about 85/15 in a continuous or semicontinuous manner to a well mixed reactor operating under emulsion polymerization conditions and initially comprising from about 0.05 to about 5.0 percent by weight (based on final copolymer weight) of a polymeric seed latex, until the weight percent of unreacted α-methyl styrene plus acrylonitrile based on total monomer and polymer weight is about 20–45;

(2) continuously or semicontinuously charging to the reactor with mixing under emulsion polymerization conditions a second monomer feed stream comprising acrylonitrile in the substantial absence of α-methyl styrene until the weight percent of unreacted α-methyl styrene plus acrylonitrile remaining in the reactor is about 5–15 percent based on total monomer weight;

(3) continuing the emulsion polymerization until total monomer conversion reaches at least about 90 percent;

(4) recovering the copolymer of α-methyl styrene and acrylonitrile.

2. The process of claim 1 wherein the first monomer feed stream consists essentially of α-methyl styrene and acrylonitrile.

3. A process for preparing copolymers of α-methylstyrene and acrylonitrile having improved uniformity and an overall monomer weight ratio (α-methylstyrene/acrylonitrile) from about 70/30 to about 85/15 comprising the steps of:

(1) charging a first monomer feed stream comprising α-methylstyrene and acrylonitrile in a weight ratio of from about 75/25 to about 85/15 in a continuous or semicontinuous manner to a well mixed reactor operating under emulsion polymerization conditions and initially comprising from about 0.05 to about 5.0% by weight (based on final copolymer weight) of a polymeric seed latex, until the weight percent of unreacted α-methylstyrene plus acrylonitrile based on total monomer and polymer weight is about 20–45 and the excess of unreacted α-methylstyrene monomer is from 600 to about 5000 weight percent based on unreacted acrylonitrile;

(2) continuously or semicontinuously charging to the reactor with mixing under emulsion polymerization conditions a second monomer feed stream comprising acrylonitrile in the substantial absence of α-methylstyrene until the weight percent of unreacted α-methylstyrene plus acrylonitrile remaining in the reactor is about 5–15% based on total monomer weight while maintaining an excess of unreacted α-methylstyrene of from 600 to 5000 weight percent based on the weight of unreacted acrylonitrile;

(3) continuing the emulsion polymerization until total monomer conversion reaches at least about 90%;

(4) recovering the copolymer of α-methylstyrene and acrylonitrile.

4. The process of claim 3 wherein the first monomer feed stream consists essentially of α-methyl styrene and acrylonitrile.

5. A process according to claim 3 wherein the first monomer stream has a monomer ratio of α-methylstyrene/acrylonitrile from about 80/20 to about 85/15.

6. A process according to claim 3 wherein the total monomer conversion reaches from about 90% to about 96%.

* * * * *